US011277672B1

(12) United States Patent
Gevargis (10) Patent No.: US 11,277,672 B1
(45) Date of Patent: Mar. 15, 2022

(54) 5G WITH ATSC 3.0 NETWORK EXTENDER

(71) Applicant: DISH Wireless L.L.C., Englewood, CO (US)

(72) Inventor: George Gevargis, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

(21) Appl. No.: 17/065,376

(22) Filed: Oct. 7, 2020

(51) Int. Cl.
| *H04N 21/436* | (2011.01) |
| *H04N 21/643* | (2011.01) |
| *H04N 21/41* | (2011.01) |
| *H04N 21/61* | (2011.01) |

(52) U.S. Cl.
CPC ....... *H04N 21/643* (2013.01); *H04N 21/4126* (2013.01); *H04N 21/436* (2013.01); *H04N 21/6137* (2013.01)

(58) Field of Classification Search
None
See application file for complete search history.

(56) References Cited

U.S. PATENT DOCUMENTS

| 9,113,042 | B2* | 8/2015 | Bennett | H04W 12/02 |
| 9,769,417 | B1* | 9/2017 | Yarygin | H04N 21/434 |
| 2006/0181982 | A1* | 8/2006 | Villevieille | H04H 20/61 |
| | | | | 369/47.1 |
| 2010/0257281 | A1* | 10/2010 | Patel | G06F 15/173 |
| | | | | 709/239 |
| 2010/0269147 | A1* | 10/2010 | Zetterower | H04N 21/4325 |
| | | | | 725/114 |
| 2010/0287480 | A1* | 11/2010 | Hicks, III | H04L 12/2809 |
| | | | | 715/751 |
| 2020/0169792 | A1* | 5/2020 | Clift | H04N 21/236 |

FOREIGN PATENT DOCUMENTS

| CN | 103326945 A | * | 9/2013 | |
| JP | 2008193656 A | * | 8/2008 | |
| WO | WO-2006086286 A2 | * | 8/2006 | .......... H04M 1/6091 |
| WO | WO-2008151352 A1 | * | 12/2008 | ............. G06Q 30/02 |
| WO | WO-2018016831 A1 | * | 1/2018 | ............. H02M 1/083 |

OTHER PUBLICATIONS

ScreenBeam® Inc., "The differences between a WiFi booster, WiFi extender and WiFi repeater," retrieved Feb. 23, 2021, 12 pages.

* cited by examiner

*Primary Examiner* — William J Kim
(74) *Attorney, Agent, or Firm* — Seed IP Law Group LLP (57) ABSTRACT

Embodiments are directed towards providing extended Advanced Television Systems Committee (ATSC) 3.0 compliant content. An ATSC 3.0 extension device receives ATSC 3.0 compliant content and other data via a broadband communication. The ATSC 3.0 extension device broadcasts the ATSC 3.0 compliant content via ATSC 3.0 data signals and broadcasts the other data via 5G data signals. A user device receives the ATSC 3.0 compliant content via the ATSC 3.0 data signals and receives the other data via the 5G data signals. The user device combines and outputs the ATSC 3.0 compliant content with the other data for presentation to a user.

20 Claims, 5 Drawing Sheets

5G WITH ATSC 3.0 NETWORK EXTENDER

BACKGROUND

Technical Field

The present disclosure relates generally to digital message communications and, more particularly, to extending broadcast capabilities of ATSC 3.0 compliant content.

Description of the Related Art

Smart phones are being used more and more by more and more people. As the use of smart phones has increased, so too has the desire for more reliable transmission of audiovisual content. In an effort to improve the transmission reliability of audiovisual content, networks continue to improve with faster speeds with increased bandwidth. Some locations and situations, however, can result coverage outages, slower speeds, or locations lacking in coverage. It is with respect to these and other considerations that the embodiments described herein have been made.

BRIEF SUMMARY

Briefly described, embodiments are directed toward systems and methods of providing extended Advanced Television Systems Committee (ATSC) 3.0 compliant content. An ATSC 3.0 extension device receives ATSC 3.0 compliant content and other data via a broadband communication. The ATSC 3.0 extension device broadcasts the ATSC 3.0 compliant content via ATSC 3.0 data signals and broadcasts the other data via 5G data signals. A user device receives the ATSC 3.0 compliant content via the ATSC 3.0 data signals and receives the other data via the 5G data signals. The user device combines and outputs the ATSC 3.0 compliant content with the other data for presentation to a user.

In this way, the ATSC 3.0 extension device can operate as a network extender, range extender, or network repeater for ATSC 3.0 compliant content.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
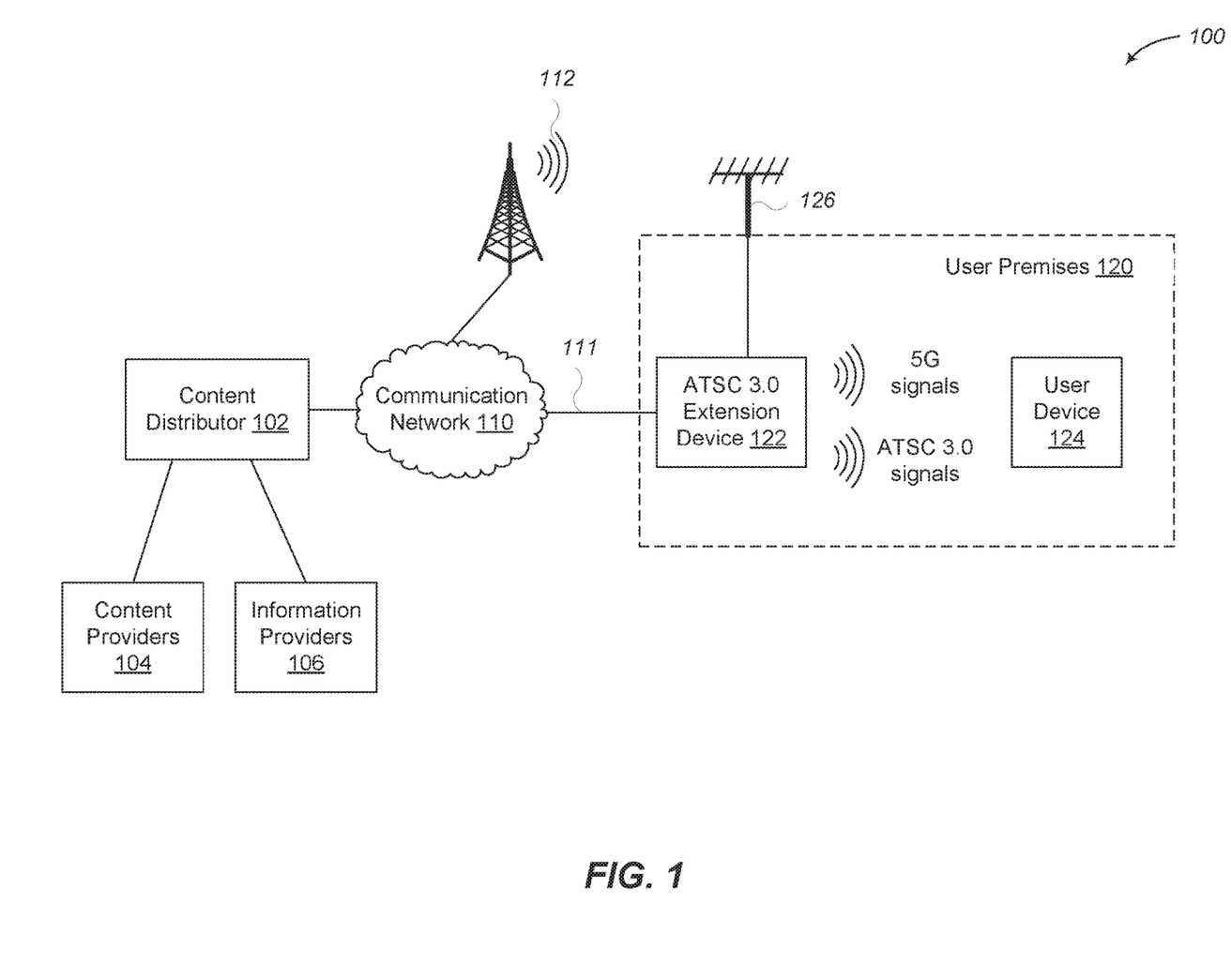
FIG. 1 illustrates a context diagram of an environment for providing extended coverage ATSC 3.0 compliant content in accordance with embodiments described herein.

FIG. 1 illustrates a context diagram of an environment for providing extended coverage for ATSC 3.0 compliant content in accordance with embodiments described herein. Environment 100 includes content providers 104, information providers 106, content distributor 102, communication network 110, and user premises 120.

User premises 120 includes an ATSC 3.0 extension device 122 and a user device 124. The user premises 120 may be defined by or referred to as the broadcast range of ATSC 3.0 wireless signals or 5G wireless signals from the ATSC 3.0 extension device 122 to the user device 124.

The ATSC 3.0 extension device 122 is a computing device that receives ATSC 3.0 compatible audiovisual content from content distributor 102 and broadcasts that content to the user device 124 using ATSC 3.0 compatible communication signals. The ATSC 3.0 extension device 122 can also receive other data or content that is 5G compatible, which it then broadcasts to the user device 124 using 5G compatible wireless communication signals.

In various embodiments, the ATSC 3.0 extension device 122 receives the ATSC 3.0 compliant content from the content distributor 102 via wired broadband signals via link

111. In some embodiments, the broadband signals may be received via Fixed Wireless Access instead of or in addition to wired signals. In at least one embodiment, the ATSC 3.0 compliant content is converted to or encapsulated in Internet Protocol communication protocols. In other embodiments, the ATSC 3.0 extension device 122 receives the ATSC 3.0 compliant content from the content distributor 102 using an ATSC 3.0 over-the-air antenna 126 to receive over-the-air communication protocols via broadcast signals 112. In some embodiments, the ATSC 3.0 over-the-air antenna 126 may be embedded in the ATSC 3.0 extension device 122. In other embodiments, the ATSC 3.0 over-the-air antenna 126 may be positioned somewhere else on the user premises 120 that is external, separate, or remote to the ATSC 3.0 extension device 122, such as outside the home, and connected to the ATSC 3.0 extension device 122 via a wired connection. In this way, ATSC 3.0 signals for a local broadcast that can be clearly received outside the home can be rebroadcast inside the home, which can enable a TV to pick up local broadcast.

In some embodiments, the ATSC 3.0 extension device 122 may be a network extender that receives the ATSC 3.0 compliant content and the other (5G compatible) data and provides it to the user device 124. In other embodiments, the ATSC 3.0 extension device 122 may be a range extender such that the ATSC 3.0 extension device 122 receives the ATSC 3.0 compliant content via over-the-air transmission, modifies the signal (e.g., by changing the transmission frequency or channel) and broadcasts the ATSC 3.0 compliant content using the modified signal. In some other embodiments, the ATSC 3.0 extension device 122 may be a network repeater that receives the ATSC 3.0 compliant content and re-broadcasts the content without modification. In this way, the ATSC 3.0 extension device 122 can provide ATSC 3.0 access during a loss of coverage, to areas that do not have coverage, or boost an existing over-the-air signal.

The user device 124 is a computing device that receives content for presentation on a display device (not illustrated) to a user or viewer on user premises 120. In particular, the user device 124 receives the ATSC 3.0 compliant content via ATSC 3.0 signals, other data or content via 5G signals, or some combination thereof. In general, the ATSC 3.0 compliant content includes video content, audio content, or some combination thereof. The other data or content may include metadata, advertisements, informational banners or tickers, or other data that could be used in the presentation of the ATSC 3.0 compliant content to the user. Examples of user device 124 may include, but are not limited to, a set-top box, a cable connection box, a computer, television receiver, radio receiver, mobile device, smartphone, tablet, laptop computer, smart watch, or other content receivers.

In various embodiments, the content distributor 102 provides content to the ATSC 3.0 extension device 122 via communication network 110—by wired broadband connection or over-the-air broadcast, or both. The content distributor 102 may receive a plurality of different content from one or more content providers 104, one or more information providers 106, or a combination thereof.

The following briefly discusses additional components in example environment 100. The content distributor 102 provides content, whether obtained from content provider 104 or data received from information provider 106, to a user or viewer through a variety of different distribution mechanisms. For example, in some embodiments, content distributor 102 may provide the content and data to an ATSC 3.0 extension device 122 through communication network 110 or over-the-air broadcast signals 112.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Typically, content providers 104 generate, aggregate, and/or otherwise provide content that is provided to one or more users or viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together. Moreover, in some embodiments, the content provider 106 may provide the data to the ATSC 3.0 extension device 122 separate from or independent of content distributor 102. In various embodiments, this additional data may be included with the content as metadata, which may be in embedded with the content or provided as a data stream that is separate from the data stream of the content.

Figure 2:
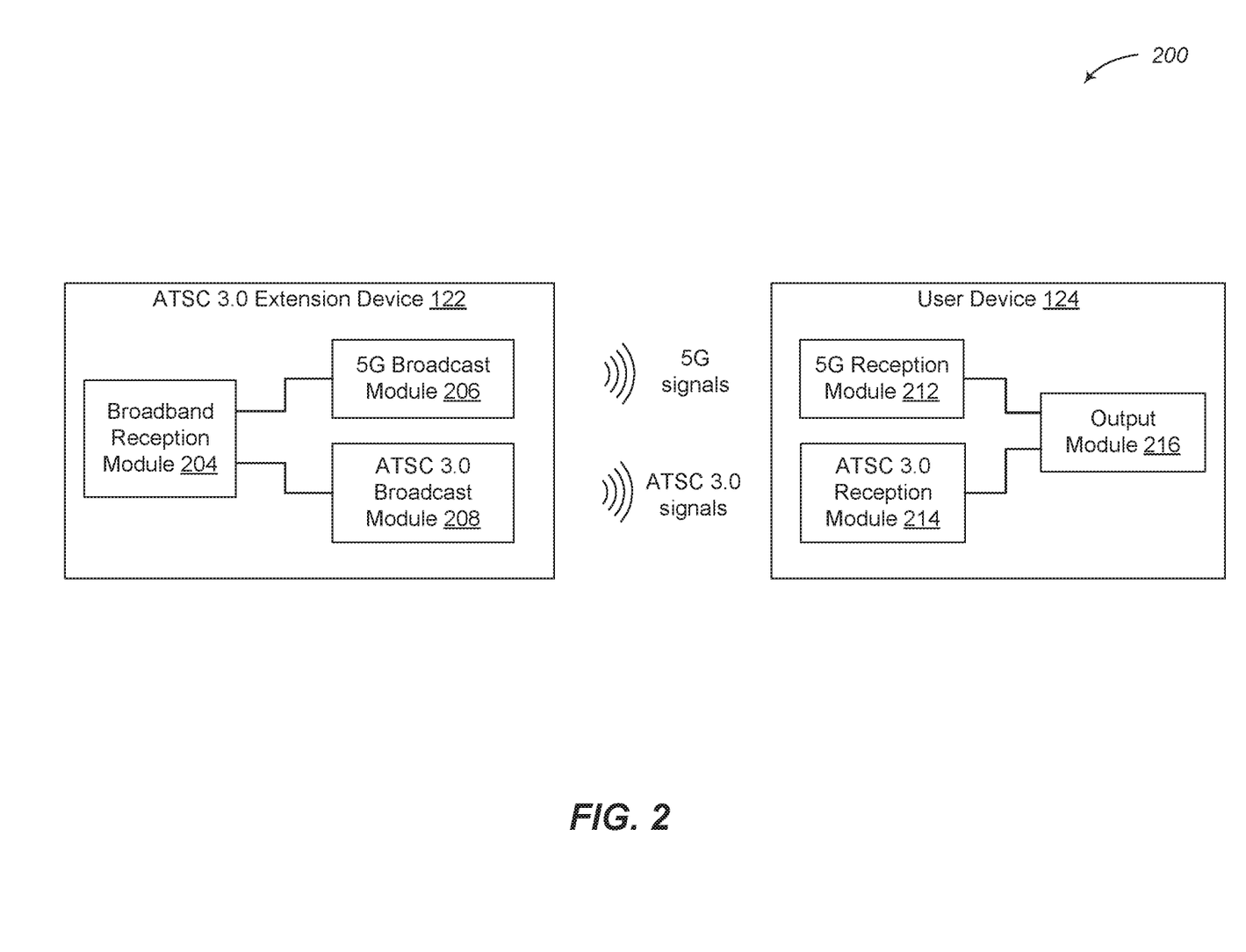
FIG. 2 is a context diagram of a non-limiting embodiment of systems that provide functionality to extend coverage of ATSC 3.0 compliant content in accordance with embodiments described herein.

FIG. 2 is a context diagram of a non-limiting embodiment of systems that provide functionality to extend coverage of ATSC 3.0 compliant content in accordance with embodiments described herein. Example system 200 includes ATSC 3.0 extension device 122 and user device 124, such as described in FIG. 1.

The ATSC 3.0 extension device 122 is a computing device that includes a broadband reception module 204, 5G broadcast module 206, and ATSC 3.0 broadcast module 208. Additional details of the computing components of the ATSC 3.0 extension device 122 are described in conjunction with FIG. 5.

The broadband reception module 204 receives ATSC 3.0 compliant content via a broadband connection. As noted herein, the ATSC 3.0 compliant content is audio, video, or audiovisual content that can be broadcast from the ATSC 3.0 extension device 122. The broadband reception module 204 extracts or obtains the ATSC 3.0 compliant content and any other data from the signals received via the broadband connection. In some embodiments, the broadband reception module 204 may also obtain the ATSC 3.0 compliant content via an ATSC 3.0 over-the-air transmission.

The ATSC 3.0 broadcast module 208 receives the ATSC 3.0 compliant content from the broadband reception module 204. The ATSC 3.0 broadcast module 208 enables or otherwise prepares the ATSC 3.0 compliant content for broadcast to the user device 124 via ATSC data signals and protocols.

The 5G broadcast module 206 receives other, non-ATSC 3.0 compliant content from the broadband reception module 204. The 5G broadcast module 206 enables or otherwise prepares the other data for broadcast to the user device 124 via 5G data signals and protocols.

The user device 212 is a computing device that includes a 5G reception module 212, an ATSC 3.0 reception module 214, and an output module 216. Additional details of the computing components of the user device 124 are described in conjunction with FIG. 5.

The ATSC 3.0 reception module 208 receives the ATSC 3.0 compliant content from the ATSC 3.0 extension device 122. The ATSC 3.0 reception module 208 provides the ATSC 3.0 compliant content to the output module 216 for presentation to a user.

The 5G reception module 212 receives the other, non-ATSC 3.0 compliant content from the ATSC 3.0 extension device 122. The 5G reception module 212 provides the other data to the output module 216 to be combined with or to control presentation of the ATSC 3.0 extension device 122.

The output module 216 combines, modifies, or augments the ATSC 3.0 compliant content with the other content. For example, the ATSC 3.0 compliant content may be an individual-generated video, such as a home video, that is received from a video sharing website. The other content may be a number of likes or comments associated with the video. Likewise, the other content may be an advertisement that can be overlaid on the video. The output module 216 may then facilitate the presentation of the video and the other content to a user.

In some embodiments, the ATSC 3.0 extension device 122 may have an ATSC 3.0 reception module (not illustrated) to receive ATSC 3.0 signals locally broadcast from a content distributor (not illustrated). This ATSC 3.0 reception module can provide the received signals to the ATSC 3.0 broadcast module 208 to provide the ATSC 3.0 compliant content to the user device 124.

The operation of certain aspects will now be described with respect to FIGS. 3 and 4. In at least one of various embodiments, process 300 described in conjunction with FIG. 3 may be implemented by or executed via circuitry or on one or more computing devices, such as ATSC 3.0 extension device 122 in FIG. 1; and process 400 described in conjunction with FIG. 4 may be implemented by or executed via circuitry or on one or more other computing devices, such as user device 124 in FIG. 1.

Figure 3:
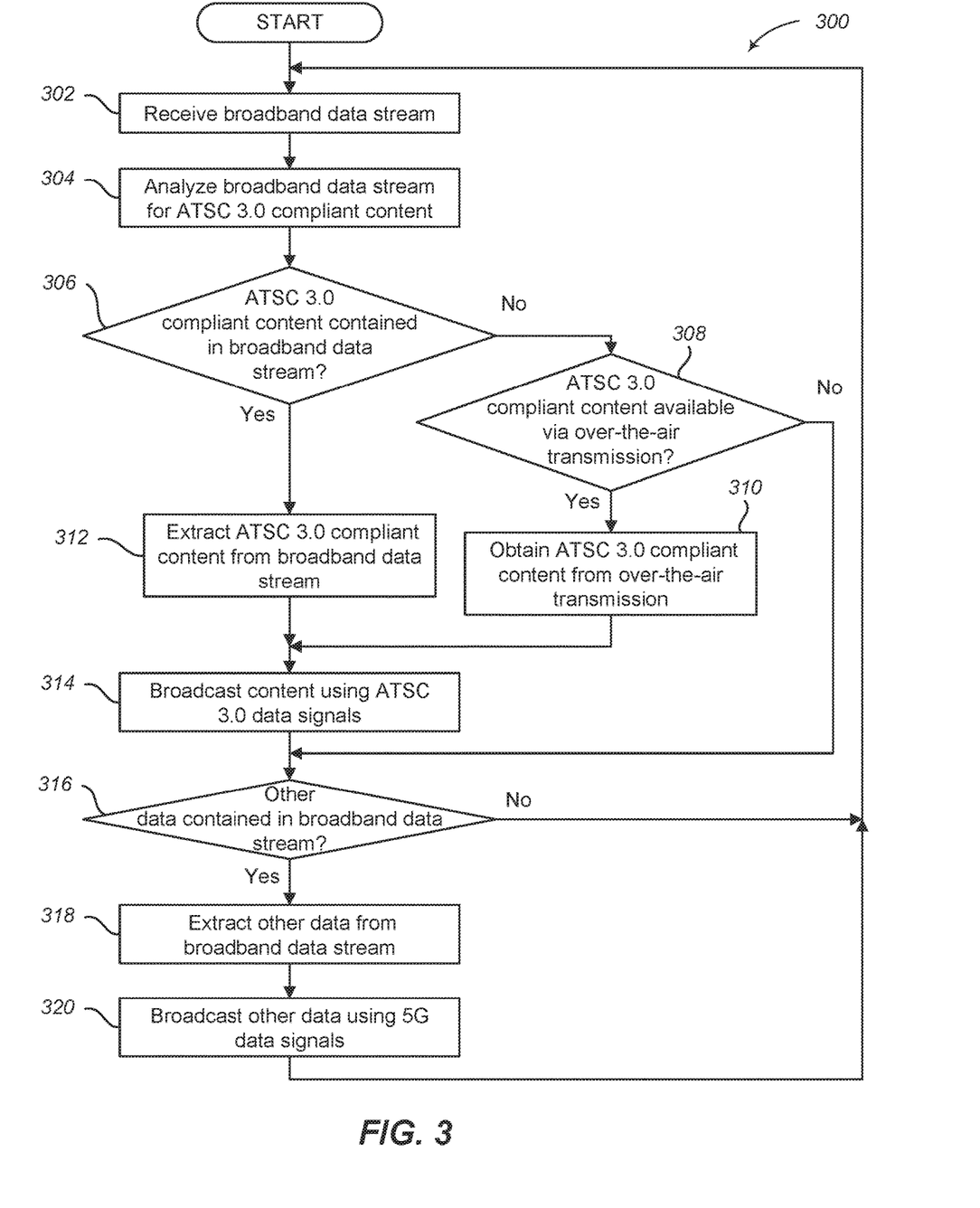
FIG. 3 illustrates a logical flow diagram showing one embodiment of a process for an ATSC 3.0 extension device to provide extended coverage for ATSC 3.0 compliant content to other devices in accordance with embodiments described herein.

FIG. 3 illustrates a logical flow diagram showing one embodiment of a process 300 for an ATSC 3.0 extension device to provide extended coverage for ATSC 3.0 compliant content to other devices in accordance with embodiments described herein.

Process 300 begins, after a start block, at block 302, where a broadband data stream is received. In various embodiments, the broadband data stream may include ATSC 3.0 compliant content, other data or content, or some combination thereof.

Process 300 proceeds to block 304, where the broadband data stream is analyzed for ATSC 3.0 compliant content. In some embodiments, the broadband data stream may include header packets, flags, or other information or metadata to indicate that the broadband data stream includes ATSC 3.0 compliant content.

Process 300 continues at decision block 306, where a determination is made whether the broadband data stream includes ATSC 3.0 compliant content. If the broadband data stream includes ATSC 3.0 compliant content, then process 300 flows to block 312; otherwise, process 300 flows to decision block 308.

At block 312, the ATSC 3.0 compliant content is extracted from the broadband data stream. After block 312, process 300 flows to block 314.

If, at decision block 306, the broadband data stream does not include ATSC 3.0 compliant content, then process 300 flows from decision block 306 to decision block 308. At decision block 308, a determination is made whether the ATSC 3.0 compliant content is available via over-the-air transmission. In at least one embodiment, the ATSC 3.0 extension device checks signals received from an antenna connected to the ATSC 3.0 extension device to determine if ATSC 3.0 compliant content is being broadcast and received. If the ATSC 3.0 compliant content is available via over-the-air transmission, process 300 flows to block 310; otherwise, process 300 flows to decision block 316.

At block 310, ATSC 3.0 compliant content is obtained from over-the-air transmission. After block 310, process 300 flows to block 314.

At block 314, the ATSC 3.0 compliant content is broadcast using ATSC 3.0 data signals.

Process 300 proceeds next to decision block 316, where a determination is made whether the broadband data stream includes other data or content. In some embodiments, the broadband data stream may include header packets, flags, or other information or metadata to indicate that the broadband data stream includes other or non-ATSC 3.0 compliant data or content. As noted above, the other data may include advertisements, informational banners, tickers, metadata, or other information that can be presented to a user or used to present the ATSC 3.0 compliant content to the user. If the broadband data stream includes other data, then process 300 flows to block 318; otherwise, process 300 loops to block 302 to continue to receive the broadband data stream.

At block 318, the other data is extracted from the broadband data stream.

Process 300 continues next at block 320, where the other data is broadcast using wireless 5G data signals. After block 320, process 300 loops to block 302 to continue to receive the broadband data stream.

Figure 4:
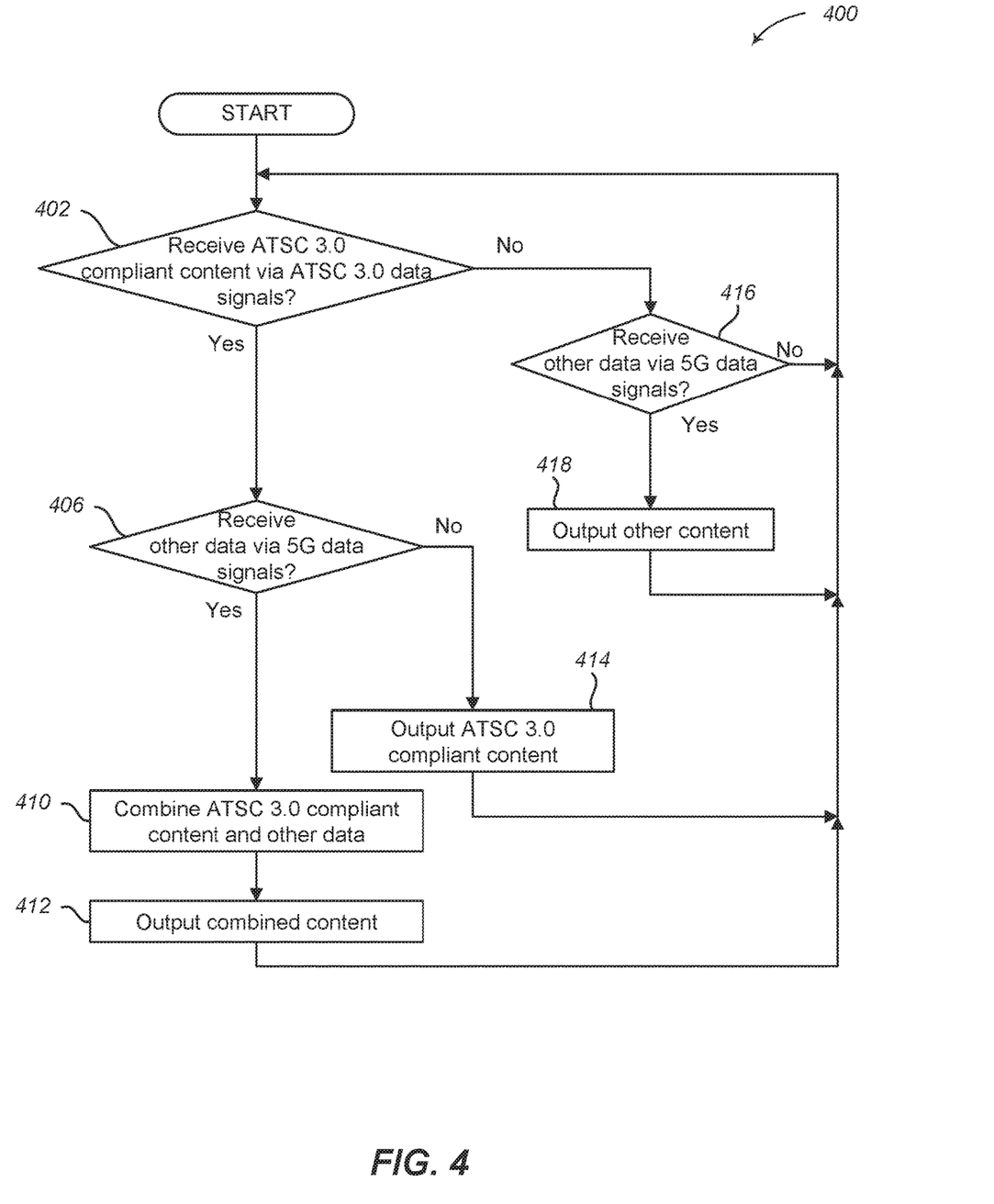
FIG. 4 illustrates a logical flow diagram showing one embodiment of a process for a user device to receive extended coverage ATSC 3.0 compliant content in accordance with embodiments described herein.

FIG. 4 illustrates a logical flow diagram showing one embodiment of a process 400 for a user device to receive extended coverage ATSC 3.0 compliant content in accordance with embodiments described herein Process 400 begins, after a start block, at decision block 402, where a determination is made whether ATSC 3.0 compliant content is received via the wireless ATSC 3.0 data signals. As described above, the ATSC 3.0 extension device broadcasts ATSC 3.0 compliant content via wireless ATSC 3.0 data signals. If ATSC 3.0 compliant content is received, then process 400 flows to decision block 406; otherwise, process 400 flows to decision block 416.

At decision block 406, a determination is made whether other data is received via 5G data signals. As described above, the ATSC 3.0 extension device may broadcast other content via 5G data signals. If other data is received via 5G data signals, then process 400 flows to block 410; otherwise, process 400 flows to block 414.

At block 410, the ATSC 3.0 compliant content is combined with the other data. In some embodiments, the other data may contain visual content, audio content, or audiovisual content that is separate from the ATSC 3.0 compliant content. The user device can combine, augment, or modify the ATSC 3.0 compliant content with the other content. For example, if the other content includes an advertisement informational banner, then the advertisement may be overlaid on the ATSC 3.0 compliant content. In other embodiments, the other data may modify or control the presentation of the ATSC 3.0 compliant content. For example, the other data may indicate that a particular language of audio is to be played with the video content.

Process 400 proceeds next to block 412, where the combined content is output. In some embodiments, the combined content is displayed or presented to a user. In other embodiments, the combined content is transmitted or provided to another device, such as a television or other display device, for presentation to the user. After block 412, process 400 loops to decision block 402 to determine if additional ATSC 3.0 compliant content is received.

If, at decision block 406, other data is not received via 5G data signals, along with the ATSC 3.0 compliant content, then process 400 flows from decision block 406 to block 414. At block 414, the ATSC 3.0 compliant content is output to the user. In various embodiments, block 414 may employ embodiments of block 412 to output content. After block 414, process 400 loops to decision block 402 to determine if additional ATSC 3.0 compliant content is received.

If, at decision block 402, ATSC 3.0 compliant content is not received, then process 400 flows from decision block 402 to decision block 416. At decision block 416, a determination is made whether other data is received via 5G data signals. If other data is received, process 400 flows to block 418; otherwise, process 400 loops to decision block 402 to determine if ATSC 3.0 compliant content is received.

At block 418, the other content is output to a user, such as via a display device. After block 418, process 400 loops to decision block 402 to determine if ATSC 3.0 compliant content is received.

The various blocks illustrated in FIGS. 3 and 4 may be performed sequentially, in parallel, or in other orders than what is illustrated. For example, block 314 and block 320 in FIG. 3 may be performed in parallel such that the broadcast of the ATSC 3.0 compliant content is performed substantially parallel to the broadcast of the other data via 5G data signals. As another example, decision block 402 and decision block 406 (or decision block 416) in FIG. 4 may be performed in parallel such that the user device determines if ATSC 3.0 compliant content is received substantially parallel to determining if other data is received via 5G data signals.

Figure 5:
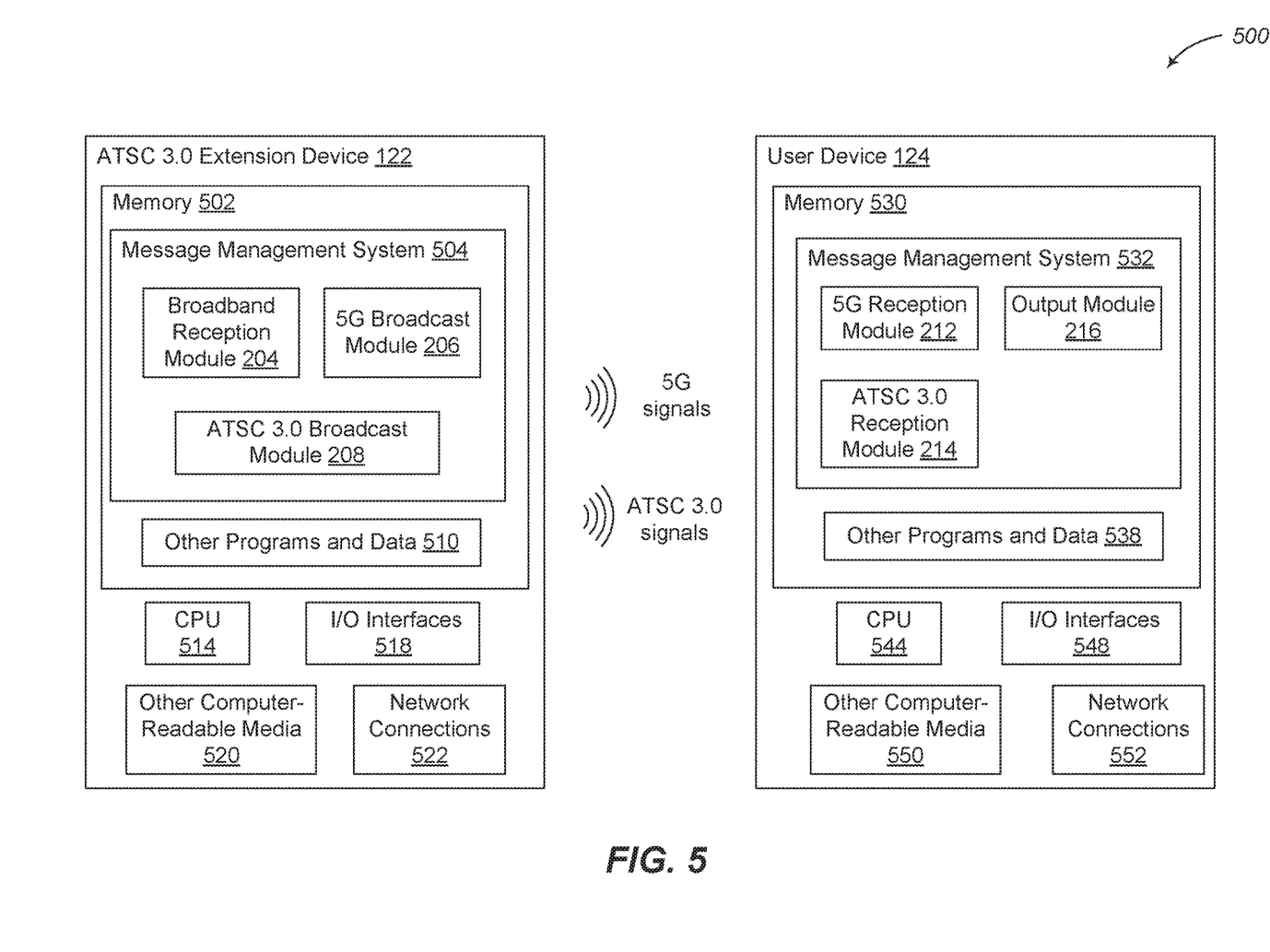
FIG. 5 shows a system diagram that describe various implementations of computing systems for implementing embodiments described herein.

FIG. 5 shows a system diagram that describes one implementation of computing systems for implementing embodiments described herein. System 500 includes an ATSC 3.0 extension device 122 and a user device 124.

ATSC 3.0 extension device 122 receives ATSC 3.0 compliant content via a broadband connection and broadcasts the content via ATSC 3.0 wireless protocols. One or more special-purpose computing systems may be used to implement ATSC 3.0 extension device 122. Accordingly, various embodiments described herein may be implemented in software, hardware, firmware, or in some combination thereof. ATSC 3.0 extension device 122 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 502 may be utilized to store information, including computer-readable instructions that are utilized by CPU 514 to perform actions, including embodiments described herein.

Memory 502 may have stored thereon broadband reception module 204, 5G broadcast module 206, and ATSC 3.0 broadcast module 208. The broadband reception module 204 is configured to receive ATSC 3.0 compliant content, and optionally other data, via a broadband connection and extract the content for transmission. The 5G broadcast module 206 broadcasts or transmits the other data via 5G data signals. The ATSC 3.0 broadcast module 208 broadcasts or transmits the ATSC 3.0 compliant content via ATSC 3.0 communication protocols. Memory 502 may also store other programs and data 510, which may include ATSC 3.0 compliant data, non-ATSC 3.0 compliant data, operating systems, etc.

Network connections 522 are configured to communicate with other computing devices to facilitate the reception of content or data via broadband connection and to facilitate the broadcast of ATSC 3.0 signals, 5G signals, or a combination thereof. In various embodiments, the network connections 522 include transmitters and receivers (not illustrated) to send and receive data as described herein. I/O interfaces 518 may include a keyboard, audio interfaces, video interfaces, or the like. Other computer-readable media 520 may include other types of stationary or removable computer-readable media, such as removable flash drives, external hard drives, or the like.

User device 124 receives ATSC 3.0 compliant content via ATSC 3.0 signals, and optionally other data via 5G signals from the ATSC 3.0 extension device 122 for output or presentation to a user. One or more special-purpose computing systems may be used to implement user device 124. Accordingly, various embodiments described herein may be implemented in software, hardware, firmware, or in some combination thereof. User 124 may include memory 530, one or more central processing units (CPUs) 544, I/O interfaces 548, other computer-readable media 550, and network connections 552.

Memory 530 may include one or more various types of non-volatile and/or volatile storage technologies similar to memory 502. Memory 530 may be utilized to store information, including computer-readable instructions that are utilized by CPU 544 to perform actions, including embodiments described herein.

Memory 530 may have stored thereon 5G reception module 212, ATSC 3.0 reception module 214, and output module 216. The 5G reception module 212 receives the other data from the ATSC 3.0 extension device 122 via 5G data signals. The ATSC 3.0 reception module 214 receives the ATSC 3.0 compliant content from the ATSC 3.0 extension decision 122 via ATSC 3.0 communication protocols. The output module 126 combines or prepares the ATSC 3.0 compliant content, and optionally the other data, for output to a user, such as via a display device using I/O interfaces 548. Memory 530 may also store other programs and data 538, which may include ATSC 3.0 compliant data, non-ATSC 3.0 compliant data, operating systems, etc.

Network connections 552 are configured to communicate with other computing devices to facilitate the reception of the ATSC 3.0 signals and the 5G signals. In various embodiments, the network connections 552 include transmitters and receivers (not illustrated) to send and receive data as described herein. I/O interfaces 548 may include a keyboard, audio interfaces, video interfaces, or the like. Other computer-readable media 550 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   an ATSC (Advanced Television Systems Committee) 3.0 extension device that includes:
   a first memory that stores first computer instructions;
   a first processor that executes the first computer instructions to perform first actions, the first actions including:
   receiving, via a broadband communication, ATSC 3.0 compliant content;
   receiving, via the broadband communication, other data;
   broadcasting the ATSC 3.0 compliant content via ATSC 3.0 data signals; and
   broadcasting the other data via 5G data signals; and
   a user device that includes:
   a second memory that stores second computer instructions;
   a second processor that executes the second computer instructions to perform second actions, the second actions including:
   receiving, via the ATSC 3.0 data signals, the ATSC 3.0 compliant content;
   receiving, via the 5G data signals, the other data;
   combining the ATSC 3.0 compliant content with the other data into output content; and
   outputting the output content for presentation to a user.

2. The system of claim 1, wherein the first processor executes the first computer instructions to receive the ATSC 3.0 compliant content by performing further actions, the further actions including:
   determining that the ATSC 3.0 compliant content is unavailable via the broadband connection; and
   receiving the ATSC 3.0 compliant content via an ATSC 3.0 over-the-air transmission.

3. The system of claim 1, wherein the second processor executes the second computer instructions to combine the ATSC 3.0 compliant content with the other data into output content by performing further actions, the further actions including:
   overlaying the other data on the ATSC 3.0 compliant content.

4. The system of claim 1, wherein the second processor executes the second computer instructions to combine the ATSC 3.0 compliant content with the other data into output content by performing further actions, the further actions including:
   modifying presentation of the ATSC 3.0 compliant content based on the other data.

5. The system of claim 1, wherein the first processor executes the first computer instructions to perform further actions, the further actions including:
   extracting the ATSC 3.0 compliant content from broadband data signals receives via the broadband connection.

6. The system of claim 1, wherein the first processor executes the first computer instructions to broadcast the ATSC 3.0 compliant content via ATSC 3.0 data signals by performing further actions, the further actions including:
   converting the ATSC 3.0 compliant content from a broadband compliant protocol to an ATSC 3.0 compliant protocol.

7. The system of claim 1, wherein the other data is non-ATSC 3.0 compliant content.

8. A method, comprising
   receiving, via a broadband communication, ATSC (Advanced Television Systems Committee) 3.0 compliant content;
   receiving, via the broadband communication, other data;
   broadcasting the ATSC 3.0 compliant content via ATSC 3.0 data signals;
   broadcasting the other data via 5G data signals;
   receiving, via the ATSC 3.0 data signals, the ATSC 3.0 compliant content;
   receiving, via the 5G data signals, the other data;
   combining the ATSC 3.0 compliant content with the other data into output content; and
   outputting the output content for presentation to a user.

9. The method of claim 8, wherein receiving the ATSC 3.0 compliant content further comprises:
   determining that the ATSC 3.0 compliant content is unavailable via the broadband connection; and
   receiving the ATSC 3.0 compliant content via an ATSC 3.0 over-the-air transmission.

10. The method of claim 8, wherein combining the ATSC 3.0 compliant content with the other data into output content further comprises:
    overlaying the other data on the ATSC 3.0 compliant content.

11. The method of claim 8, wherein combining the ATSC 3.0 compliant content with the other data into output content further comprises:
    modifying presentation of the ATSC 3.0 compliant content based on the other data.

12. The method of claim 8, further comprising:
    extracting the ATSC 3.0 compliant content from broadband data signals receives via the broadband connection.

13. The method of claim 8, wherein broadcasting the ATSC 3.0 compliant content via ATSC 3.0 data signals by further comprises:
    converting the ATSC 3.0 compliant content from a broadband compliant protocol to an ATSC 3.0 compliant protocol.

14. The method of claim 8, wherein the other data is non-ATSC 3.0 compliant content.

15. A computing device, comprising:
  a memory that stores first computer instructions;
  a processor that executes the computer instructions to perform actions, the actions including:
    receiving, via a broadband communication, ATSC 3.0 compliant content;
    receiving, via the broadband communication, other data;
    broadcasting the ATSC 3.0 compliant content via ATSC 3.0 data signals; and
    broadcasting the other data via 5G data signals.

16. The computing device of claim 15, wherein the processor executes the computer instructions to broadcast the ATSC 3.0 compliant content via ATSC 3.0 data signals by performing further actions, the further actions including:
  converting the ATSC 3.0 compliant content from a broadband compliant protocol to an ATSC 3.0 compliant protocol.

17. The computing device of claim 15, wherein the processor executes the computer instructions to receive the ATSC 3.0 compliant content by performing further actions, the further actions including:
  determining that the ATSC 3.0 compliant content is unavailable via the broadband connection; and
  receiving the ATSC 3.0 compliant content via an ATSC 3.0 over-the-air transmission.

18. The computing device of claim 15, wherein the processor executes the computer instructions to receive the ATSC 3.0 compliant content by performing further actions, the further actions including:
  determining that the ATSC 3.0 compliant content is unavailable via an ATSC 3.0 over-the-air transmission.

19. The computing device of claim 15, wherein the processor executes the computer instructions to perform further actions, the further actions including:
  extracting the ATSC 3.0 compliant content from broadband data signals received via the broadband connection.

20. The computing device of claim 15, wherein the other data is non-ATSC 3.0 compliant content.

* * * * *